(12) United States Patent
Farmer et al.

(10) Patent No.: US 6,493,200 B1
(45) Date of Patent: Dec. 10, 2002

(54) COAXIAL CABLE PROTECTION DEVICE

(75) Inventors: James O. Farmer, Liburn; Keith Fleming, Jonesboro, both of GA (US)

(73) Assignee: Arris International, Inc., Duluth, GA (US)

( * ) Notice: Subject to any disclaimer, the term of this patent is extended or adjusted under 35 U.S.C. 154(b) by 130 days.

(21) Appl. No.: 09/684,131

(22) Filed: Oct. 10, 2000

Related U.S. Application Data

(60) Provisional application No. 60/158,453, filed on Oct. 8, 1999.

(51) Int. Cl.[7] ................................................. H02H 1/00
(52) U.S. Cl. ........................................................ 361/113
(58) Field of Search ............................. 361/86, 87, 113, 361/42, 45, 49, 93, 107, 108; 333/206

(56) References Cited

U.S. PATENT DOCUMENTS 5,768,084 A * 6/1998 Chaudhry et al. .......... 361/113
5,930,100 A * 7/1999 Gasque, Jr. et al. ........ 361/117

* cited by examiner

Primary Examiner—Edward H. Tso
Assistant Examiner—Pia Tibbits

(57) ABSTRACT

This invention provides improved methods of protection required under the 1999 edition of the National Electric Code, section NEC 830 requirement that if a drop coaxial cable (usually supplying an individual residence) carries power above a certain voltage, it must include sufficient protection from electric shock for people who may come in contact with it. A drop coaxial cable would be carrying sufficient power for NEC 830 protection if it were supplying a cable telephone interface box or other AC powered network interface devices. In one embodiment, the invention utilizes the AC power signal from the drop cable to operate an AC power sensing circuit. The circuit utilizes an upper and lower current range to determine whether to activate a switch operative to interrupt the AC power in the drop cable. One variation of the invention utilizes an oscillator generated probe signal to determine if there is a valid circuit connection. Another variation of the invention utilizes an oscillator driven AC power insertion circuit to determine if there is a valid circuit connection. The invention allows RF signals to continue transmitting unimpeded.

21 Claims, 8 Drawing Sheets

COAXIAL CABLE PROTECTION DEVICE

FIELD OF INVENTION

This invention relates to the field of electrical circuits and, more specifically, to providing the protection required under the 1999 edition of the National Electric Code, section 830. This invention claims priority over provisional application No. 60/158,453 filed Oct. 8, 1999.

BACKGROUND

NEC830 deals with requirements for broadband communication systems, such as cable television systems, which provide powering on, or attached to, the coaxial cable on which signals are transmitted to bring, for example, television programs and other services to subscribers. Coaxial cable usually runs from a device called a "tap," which extracts a portion of the power from the distribution coaxial cable, to a subscriber's building or residence, hereinafter referred to simply as "the subscriber". This coaxial cable is called the "drop". NEC830 requires that if the drop carries power above a certain voltage, it must meet certain requirements for the protection of people who may come in contact with it. The most common reason the drop would be carrying power is to supply a cable telephone interface box, or network interface device (NID). The requirements of NEC830 are that the drop must meet certain physical requirements, or it must be protected by a UL "listed fault protection device", to detect if a drop is either shorted or open and, in either case, interrupt power carried in the drop until the fault has cleared.

Broadband services, such as cable telephony applications, may require AC power to be supplied from the tap cable to the drop cable. The coaxial cable drop to the subscriber is therefore "AC hot" and subjects the installer or other craftspersons working with the cable drop to potential electrical shock and/or electrocution.

An example of an NEC830 safety circuit for interrupting AC power on the drop cable is described in U.S. Pat. No. 5,793,590 to Vokey et al. The device described in Vokey is a two-unit device having a tap unit and a premise unit. An independent DC power source is used to power the two-unit device and to provide a probe voltage. A dual threshold detector compares a DC voltage drop proportional to the AC power transferred to the drop cable with a probe voltage to determine whether there is a short or open condition at the junction of the tap and drop cables. While Vokey is suitable for its general purpose, it utilizes an analog methodology that can lack long-term calibration dependability in harsh environmental conditions. Also, the limitations of monitoring a DC voltage drop proportional to the AC power transferred to the drop cable tends to make the Vokey methodology inaccurate because the monitored DC voltage drop is merely an approximation of the actual AC power transferred to the drop cable. In addition, the second (DC) power source creates certain inefficiencies. A capacitor must keep the DC power source separate from the AC power signals in the drop cable and thus is critical for the operation of the safety device as a whole. This capacitor's necessarily large physical size makes it cumbersome for circuit packaging. Capacitors of this size are available, but along with being larger than one would like in this application, getting one with an adequate current rating and good long term reliability in an outdoor (but sheltered) environment is difficult. Thus, for an efficient and reliable safety device solution it would be desirable to eliminate the need for large value capacitors and to have a precise, rather than approximate, monitoring capability.

SUMMARY OF THE INVENTION

The present invention overcomes the above-described problems in the prior art by providing a coaxial cable safety device that utilizes the AC power already present in a drop cable as a powering and monitoring solution to provide a parameter indicative of such AC power. The present invention is a coaxial cable protection system for a cable media environment that includes a primary cable and a drop cable having first and second conductors. The first and second conductors carry AC power and RF signals to a network interface device. The present invention includes a first circuit component for allowing the RF signals to be transmitted from the primary cable to the first conductor of the drop cable. A second circuit component features an active state for passing the AC power from the primary cable to the first conductor of the drop cable and a blocking state for selectively blocking the passage of AC power to the first conductor. A sensor actuates the second circuit component to block AC power from the first conductor if the current drawn between the first and second conductors is outside of a prescribed range.

A variation of the present invention is a sensing circuit utilizing the resistance in a drop cable. An oscillator generates a probe frequency. A comparator compares the resistance in a conductor with a known resistance. The known resistance is proportional to the probe frequency. An actuator opens and closes a circuit component for blocking AC power from passing to the drop cable based on the comparison of the drop cable resistance provided by the comparator with the known resistance.

Another variation of the present invention uses a frequency generation and detection circuit that monitors the drop cable for a tone signal. The drop cable has a first end and a remote end. An oscillator utilizes the AC signal from the drop cable to generate a tone signal. A circuit component actuated by the oscillator will block AC power in the drop cable if the oscillator does not generate a tone signal and will allow the AC power to pass if oscillator generates a tone signal.

DETAILED DESCRIPTION

Figure 1A:
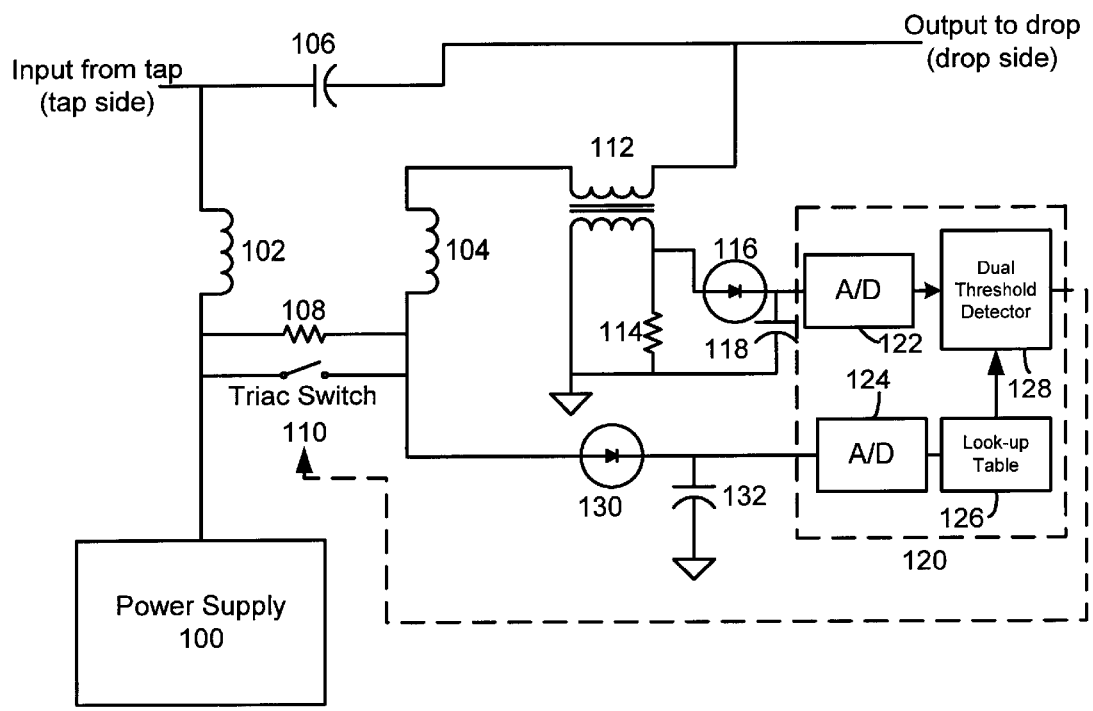
FIG. 1A is a circuit diagram that illustrates an exemplary environment suitable for implementing various embodiments of the present invention which utilizes AC power from the drop cable for an improved sensing technique.

Referring now in detail to the drawings in which like numerals refer to like parts throughout the several views, FIG. 1A is a circuit diagram that illustrates an exemplary environment suitable for implementing various embodiments of the present invention which utilizes AC power from the drop cable for an improved sensing technique.

FIG. 1A shows the first teaching of this disclosure which utilizes the AC power already present in a drop cable to power a safety circuit. In this implementation, the current being drawn by the NID is measured by the device, which is programmed for a reasonable spread over and above the known current consumption range of the device. The actual current consumed is measured, and if it does not fall within a window of acceptable values, a triac switch 110 is opened. If the triac switch 110 is opened, then a small current is provided through a resistor 108 to permit sensing, so that the circuit will know when to close the triac switch 110 again.

A capacitor 106 serves as an RF bypass, and has no effect on the powering issues. Power passes through inductor chokes 102 and 104 and normally through the triac switch 110 on its way to the drop. The current also passes through the primary of a current sense transformer 112. Those skilled in the art know that if one builds such transformer 112 with a high turns ratio and terminates it correctly with a resistor 114, the voltage on the secondary will be proportional to the current in the primary, yet there will be little voltage drop on the primary. (Though not shown, it is sometimes desirable to use a capacitor in the secondary to tune the transformer to the line frequency. Those skilled in the art understand the subtleties.) This voltage on the secondary is converted to DC by a diode 116 and capacitor 118 combination, and the DC analog is supplied to a first analog-to-digital (A/D) converter 122, which ideally is internal to the microcontroller 120.

Because the current consumption profile of the NID is a function of the input voltage level, it is also necessary to measure the input voltage, which typically can be between 40 and 90 volts AC. This measurement is made in the diode and capacitor circuit combination, 130 and 132 respectively, and inputted to the second A/D converter 124. The microcontroller 120 thus has two pieces of information on which to base a decision to open the triac switch 110 or not. One piece of information is the current being drawn by the NID, converted in the first A/D converter 122, and the other is the supply voltage, converted in the second AID converter 124.

Figure 1B:
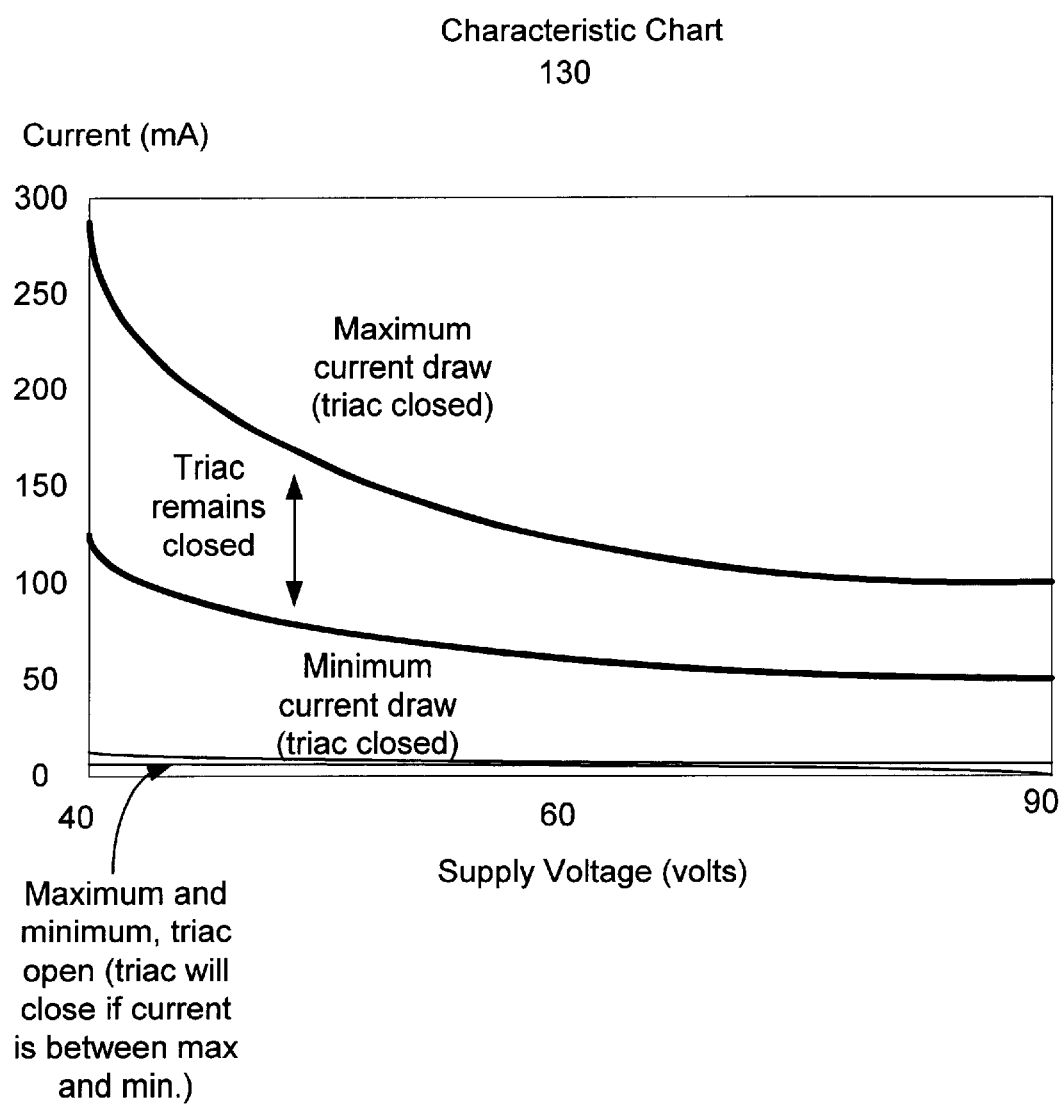
FIG. 1B is a characteristic chart that illustrates an exemplary embodiment of the present invention.

FIG. 1B is a characteristic chart that illustrates an exemplary embodiment of the present invention. The characteristic chart 130 shows a current vs. voltage profile for a typical four line voice port NID. Four line voice port NIDs interface one to four telephone lines in a house to the drop cable. More current is drawn when the phones are ringing than when they are on-hook and not being used. The difference between the maximum and minimum current curves on the characteristic chart 130 is the difference between all four lines ringing one phone each, and all four lines being on-hook (not being used).

The look-up table component in the microcontroller 120 reads the supply voltage, the horizontal axis in the characteristic chart 130. From that, it is programmed to provide the appropriate limits of the maximum and minimum curves to a dual threshold detector 128, which is implemented in software in this embodiment of the invention. So long as the current measured and converted by the A/D converter 122 is within this range, the triac switch 110 remains closed, supplying power to the NID. If the current falls outside of this range, then either there is a short circuit or there is an open circuit, so the microcontroller 120 opens the triac switch 110, removing power from the drop.

If the triac switch 110 is open, then some small current is developed through the probe resistor 108. This is necessary in order to "probe" the drop circuit, so that the system will know when the drop is properly connected and triac switch 110 should be closed. Shown at the bottom of the characteristic chart 130 are two curves which define the maximum and minimum current range expected when the triac switch 110 is open and some current has been developed through the probe resistor 108. When the current falls between these two curves, then the microcontroller 120 concludes that the circuit is properly made, and it closes the triac switch 110. After that, it monitors within the upper curves of the characteristic chart 130, to make sure the current stays within the prescribed limits.

It is possible to implement this embodiment without using a microcontroller, but the simplicity and versatility inherent in microcontroller control makes the microcontroller very attractive. Using the microcontroller, it is feasible to provide additional features such as opening the switch quickly if a very large over-current is detected, but opening after a delay for a small over-current. This would protect against a situation where a phone line with many phones was ringing. Also, a slow start feature can be programmed, in which once the current enters the triac open range, power is not applied for several seconds. This will protect against applying power when a craftsperson is still making connections.

Figure 2A:
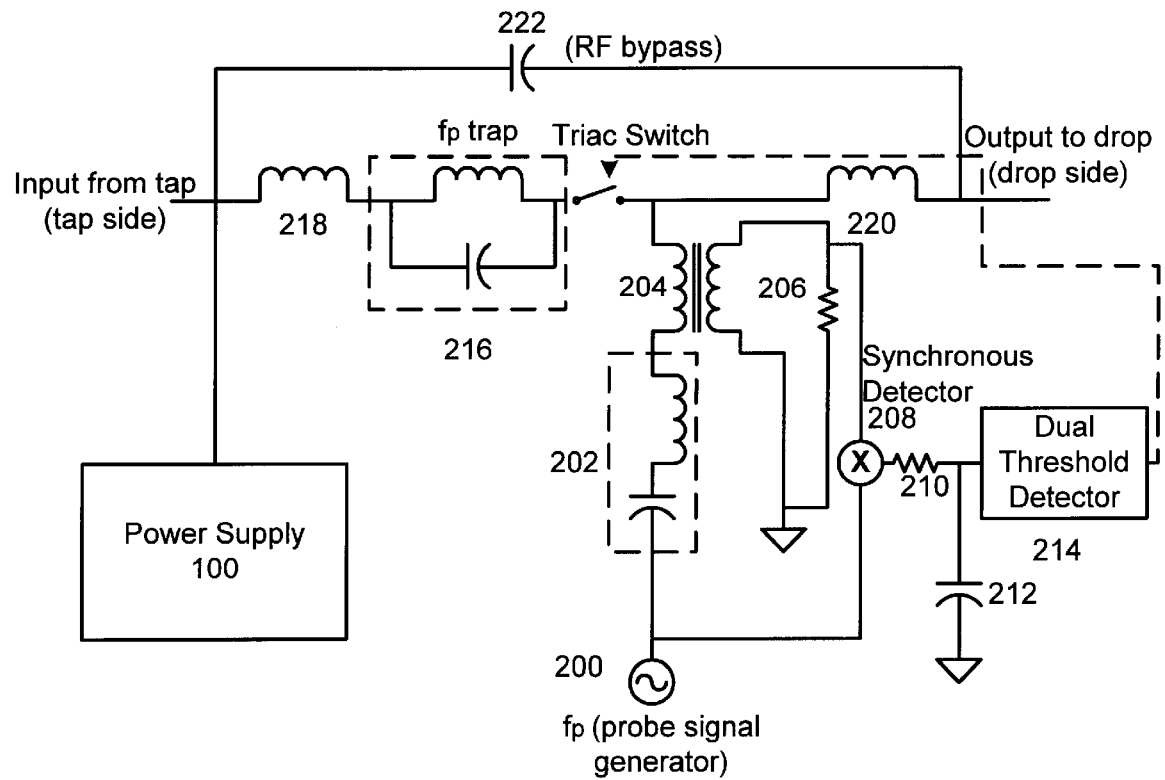
FIG. 2A is a circuit diagram that illustrates an exemplary environment suitable for implementing various embodiments of the present invention which utilizes an oscillator for an improved sensing technique.

FIG. 2A is a circuit diagram that illustrates an exemplary environment suitable for implementing various embodiments of the present invention which utilizes an oscillator for an improved sensing technique. A signal is generated and supplied to a NID-end circuit, and the resulting current is measured to determine if there is a valid circuit connection. This embodiment uses a relatively high frequency signal, which can be blocked with small inductors and capacitors. Suitable frequencies lie between roughly 1 kHz and 1 MHz.

An oscillator, 200, generates a probe signal at frequency $f_p$. This signal is filtered in the $f_p$ bandpass filter 202, and applied to the output of the drop. It flows through the primary of the current sense transformer 204. This transformer is identical in function and similar in construction to that of the transformer 112 in FIG. 1A. The difference is that it operates at a much higher frequency, so it can be made even smaller. As described above, the transformer 204 is constructed with a high ratio of secondary to primary turns. The secondary output voltage appearing across the resistor 206 is proportional to the probe-frequency current in the drop ($f_p$). The secondary of the transformer 204 may or may not be tuned to $f_p$. The AC voltage across the resistor 206 is demodulated in the synchronous detector 208. It is possible to use an envelope detector as in FIG. 1A, but the synchronous detector 208 allows simpler filtering of the recovered signal. The synchronous detector 208 is driven from a sample of the output of the oscillator 200. The resistor 206 and the capacitor 212 provide filtering on the detected signal. The DC voltage appearing across the capacitor 212 is thus proportional to the current in the drop due to the oscillator's 200 excitation of the drop at a frequency of $f_p$. A dual threshold detector 214 is used to determine if the current is within prescribed limits. If so, then the dual threshold detector 214 closes the triac switch, allowing power to be applied to the NID. If the current is not within prescribed limits, indicating either a short or open on the drop, the triac switch is opened and power does not flow to the NID.

The $f_p$ trap 216 isolates the supply circuit coming from the tap, from the probe signal. In FIG. 1A the probe signal is a DC signal, whereas in FIG. 2A it is a high frequency signal. To isolate it, the $f_p$ trap 216 is a parallel L-C circuit resonate at $f_p$. This provides a high frequency of $f_p$, while providing a low impedance at the much lower power frequency.

Two inductors, 218 and 220, are small radio frequency chokes used to keep the RF signals being coupled through the capacitor 222 from the probe circuitry. This helps improve return loss through the circuit.

Figure 2B:
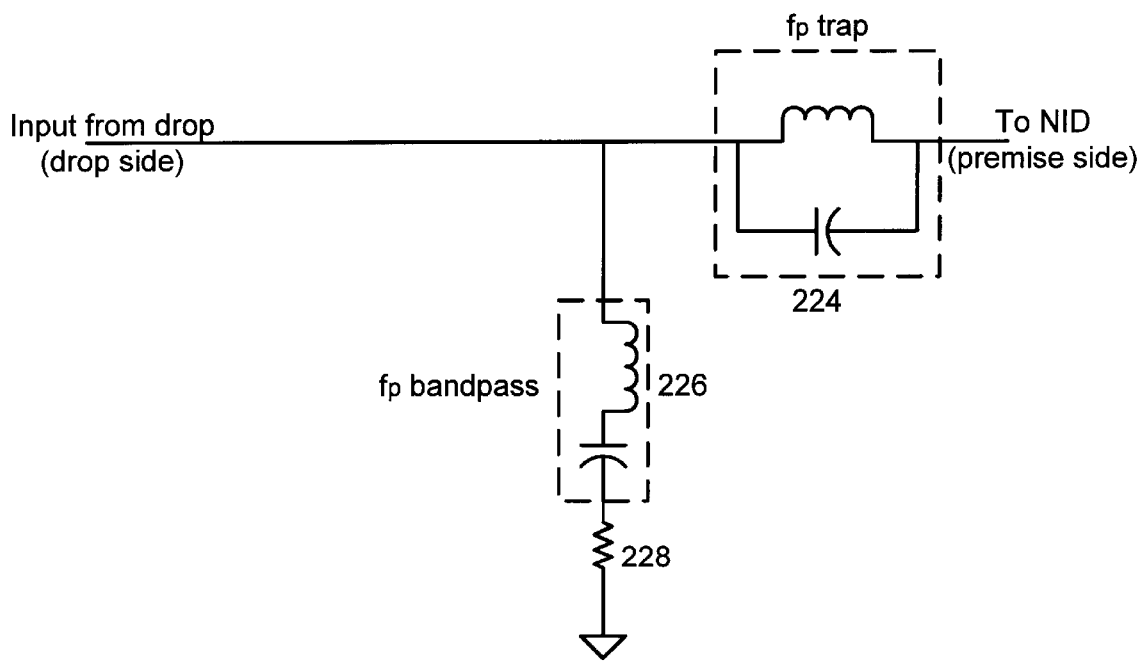
FIG. 2B is a circuit diagram that illustrates an exemplary environment suitable for implementing various embodiments of the present invention which utilizes a bandpass filter and trap circuit for an improved sensing technique.

FIG. 2B is a circuit diagram that illustrates an exemplary environment suitable for implementing various embodiments of the present invention which utilizes a bandpass filter and trap circuit for an improved sensing technique. FIG. 2B shows the circuitry at the NID-end of the drop. The $f_p$ trap 224 isolates the probe signal from the NID, and $f_p$ bandpass 226 couples the probe signal to the Resistor 228, which sets the probe current value.

Thus, this embodiment uses small L-C circuits which offer no material impedance to the power current on the drop. This increases the voltage reaching the NID, improving efficiency with switching power supplies. In addition, space and cost are saved, and the reliability of the circuit is enhanced by removing the need for large electrolytic capacitors carrying fairly substantial current.

Figure 3A:
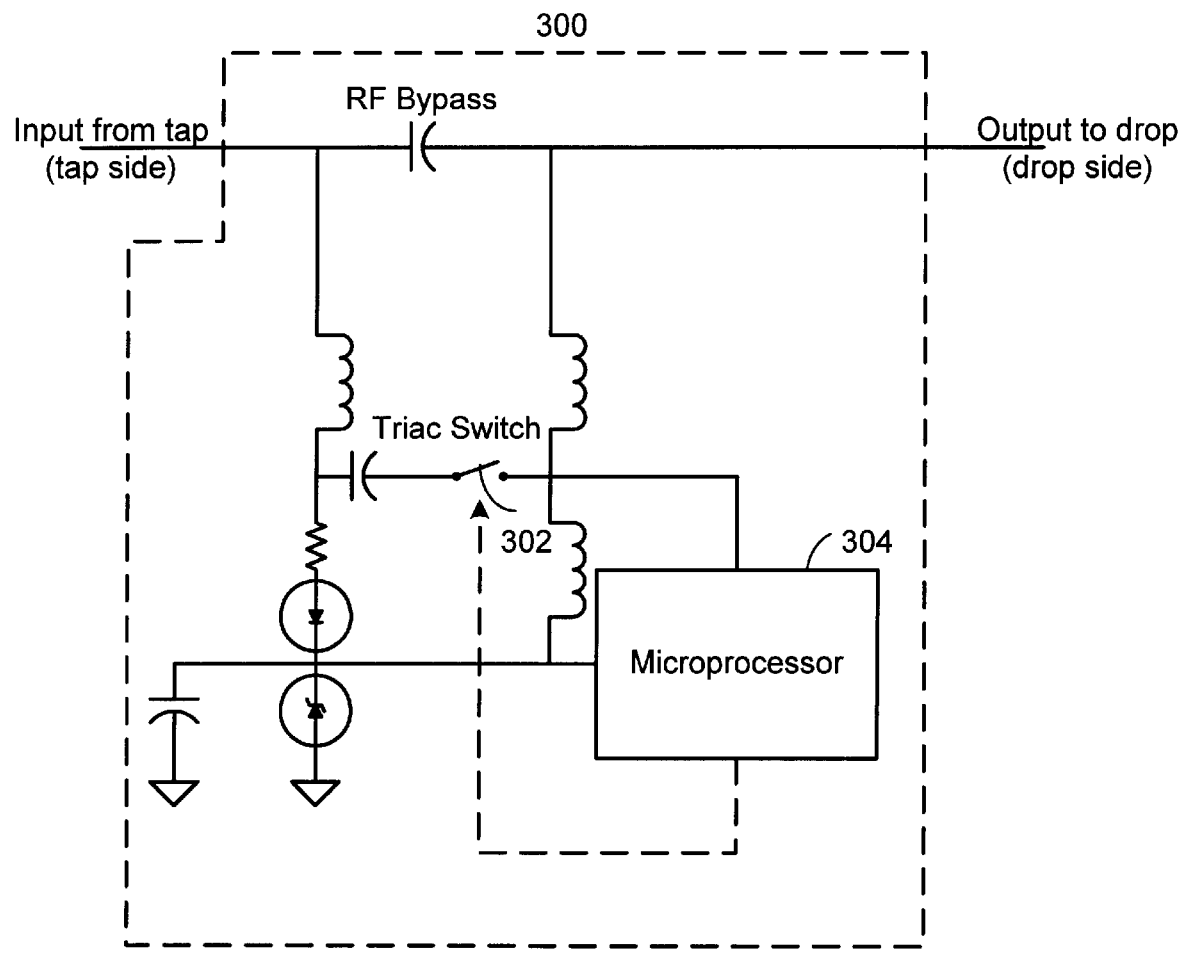
FIG. 3A is a circuit diagram that illustrates another exemplary environment suitable for implementing various embodiments of the present invention which utilizes AC power from the drop cable for an improved sensing technique.

FIG. 3A is a circuit diagram that illustrates another exemplary environment suitable for implementing various embodiments of the present invention which utilizes AC power from the drop cable for an improved sensing technique. In this embodiment, a customer premises equipment (CPE) terminal 306 and a tap equipment (TE) terminal 300, which are connected to the subscriber side and tap side of the drop cable. An example of a CPE terminal 306 circuit that can be used in implementing the present invention is shown in FIG. 3B below.

The TE terminal 300 receives AC power from the coaxial cable upstream of the TE terminal 300 and generates a DC voltage that is put on the drop cable and detected by the oscillator 308 of the CPE terminal 306. The oscillator 308 of the CPE terminal 306 detects the DC voltage and generates a tone that is put on the center conductor of the drop cable. The TE terminal 300 detects and monitors the tone on the center conductor of the drop cable provided by the oscillator 308 in the CPE terminal 306. A controller 304 in the TE terminal 300 monitors the amplitude of the frequency signal for step changes in amplitude that is indicative of a fault condition of the drop cable. The controller 304 in the TE terminal 300 is preferably an inexpensive microprocessor used for detection of the frequency signal and for controlling the triac switch 302. If the drop cable is disconnected from the CPE terminal 306, the frequency signal is no longer present, so the TE terminal detects no tone and the microprocessor 304 controls a triac switch 302 to turn off the AC voltage on the drop cable. If the drop cable is shorted out anywhere along its length, the frequency signal is no longer present, so the TE terminal 300 detects no tone and the microprocessor 304 controls a switch to turn off the AC voltage on the drop cable. If the drop cable is opened anywhere along its length, the frequency signal is no longer present, so the TE terminal 300 detects no tone and the microprocessor 304 controls a switch to turn off the AC voltage on the drop cable. The microprocessor 304 also detects changes in the amplitude of the tone signal to allow the monitoring of mall step changes of the insertion loss of the drop cable, which indicates a fault condition of the drop cable. The microprocessor 304 may also monitor the DC current on the drop cable to detect step changes in current that indicates a fault condition has occurred, but this is not necessary for the operation of the invention as described above.

Figure 3B:
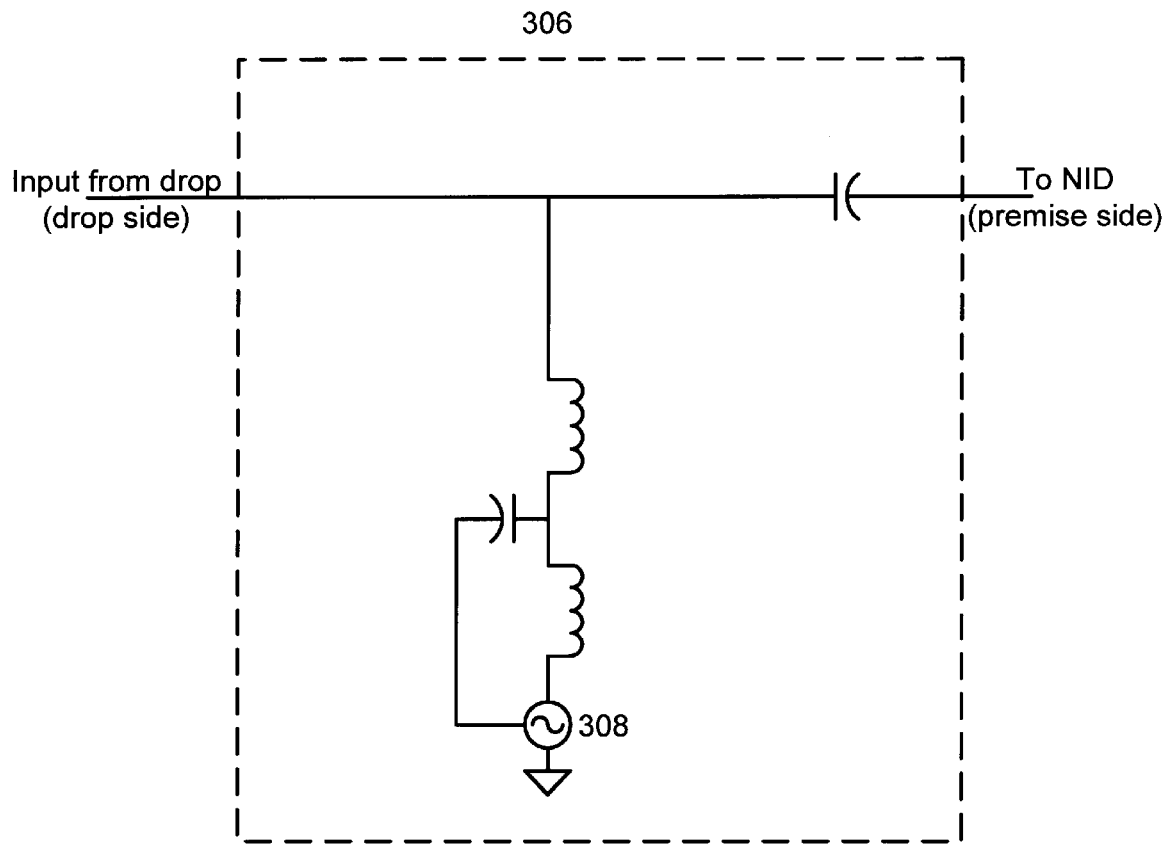
FIG. 3B is a circuit diagram that illustrates another exemplary environment suitable for implementing various embodiments of the present invention which utilizes an oscillator for an improved sensing technique.

FIG. 3B is a circuit diagram that illustrates another exemplary environment suitable for implementing various embodiments of the present invention which utilizes an oscillator for an improved sensing technique. The CPE terminal 306 has a circuit for directing a DC voltage, generated by the TE terminal 300 and provided over the drop cable, to a low frequency oscillator 308 while blocking the AC signal and while blocking the RF payload information signal on the drop cable. The indicators and capacitors shown in the CPE terminal 306 accomplish this function. When the oscillator 308 receives the DC voltage, it produces a frequency tone that is placed on the drop cable. The tone is set at a low frequency, such as 10 kHz for example, although any other suitable frequency can be used.

Figure 4A:
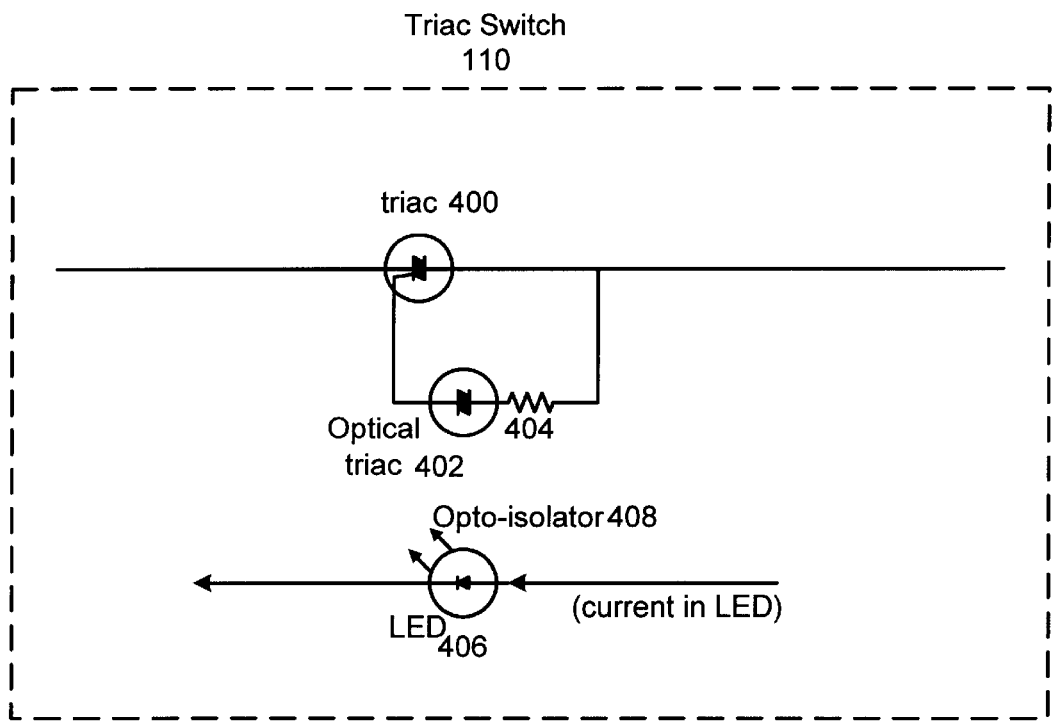
FIG. 4A is a circuit diagram that illustrates an exemplary environment suitable for implementing a triac switch.

FIG. 4A is a circuit diagram that illustrates an exemplary environment suitable for implementing a triac switch. When it is desired to close the triac switch 110, current is supplied to an LED 406, which is part of opto-isolator 408. This current causes an optical emission from the LED 406, which excites an optical triac 402. In turn this optical triac 402 supplies a switching voltage to another triac 400, which is the actual device that closes to permit power to pass.

Figure 4B:
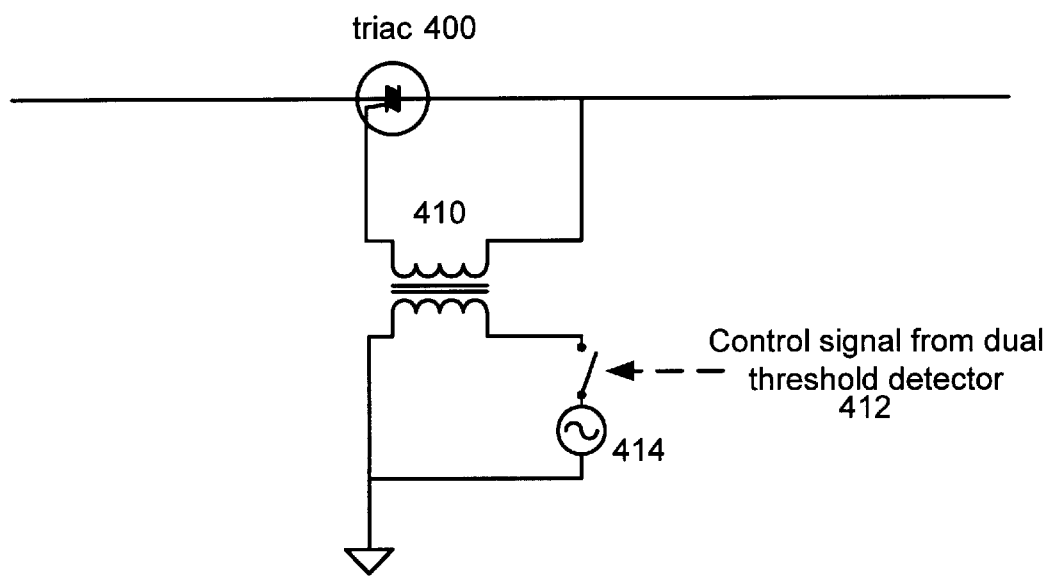
FIG. 4B is a circuit diagram that illustrates another exemplary environment suitable for implementing a triac switch.

FIG. 4B is a circuit diagram that illustrates another exemplary environment suitable for implementing a triac switch. FIG. 4B shows where an oscillator 414, for example, the $f_p$ generator of FIG. 2A, drives the triac 400 directly through a transformer 410. A variation of this is to use a blocking oscillator. Frequently an extra feedback winding on the transformer 410 is used to provide feedback to the oscillator.

Other means of achieving the switch function will be obvious to those skilled in the art. One particularly advantageous switch means is to use a mechanical latching relay. The relay will not exhibit any voltage drop in the signal path, and latching relays don't consume power when they are in a set state. Furthermore, reliability is improved because if circuitry fails, the relay will remain in its last position.

While this invention has been described in detail with particular reference to preferred embodiments thereof, it will be understood that variations and modifications can be effected within the scope of the invention as defined in the appended claims.

What is claimed is:

1. A coaxial cable protection system including a primary cable and a drop cable having first and second conductors for carrying AC power and RF signals to a network interface device, said system comprising:
   a first circuit component for passing the RF signal from said primary cable to the first conductor of said drop cable;
   a second circuit component with an active state for passing the AC power from said primary cable to the first conductor of said drop cable and a blocking state for selectively blocking the passage of the AC power to the first conductor of said drop cable; and
   a sensor operative to actuate the second circuit component to block AC power from said primary cable to the first conductor of said drop cable if the current drawn between the first conductor and the second conductor of said drop cable is outside of a prescribed range.

2. The coaxial cable protection device of claim 1, wherein the sensor is an AC power sensing circuit which utilizes the AC power signal from the drop cable to power said AC power sensing circuit.

3. The coaxial cable protection device of claim 1, wherein the sensor includes a prescribed upper and lower current range, said current range and the AC power signal from the drop cable utilized by said sensor to determine if the current drawn between the first conductor and the second conductor of said drop cable is outside of said current range.

4. The coaxial cable protection device of claim 1, wherein the sensor is a microprocessor implementing a dual threshold detector which utilizes the AC power signal from the drop cable.

5. The coaxial cable protection device of claim 1, wherein the second circuit component is a triac switch.

6. A method for selectively blocking AC power from being transferred from a source to a conductor, said method comprising:
   providing AC power from said source to the conductor;
   measuring said AC power in said conductor to determine a measured value;
   comparing said AC power in said conductor with a predetermined range;
   terminating the transfer of said AC power to said conductor if said measured value is outside of said predetermined range; and
   enabling said AC power to transfer to said conductor if said measured value is within said predetermined range.

7. A sensing circuit, wherein the resistance in a conductor can be obtained to selectively block an AC power signal in said conductor, said sensing circuit comprising:
   a comparator operable to compare the resistance in said conductor with a known resistance utilizing the AC power signal from said conductor; and
   an actuator operable to open and close a circuit component to block the AC power signal in said conductor based on said comparison of the resistance in said conductor provided by said comparator with said known resistance.

8. The sensing circuit of claim 7, wherein the comparator utilizes a dual threshold detector to compare the resistance in a conductor with a known resistance.

9. The sensing circuit of claim 7, wherein the comparator utilizes a look-up table to compare the resistance in a conductor with a known resistance.

10. The sensing circuit of claim 7, wherein such circuit is implemented by a microprocessor.

11. The sensing circuit of claim 7, wherein the actuator is implemented by an opto-isolator.

12. A method for blocking AC power in a conductor utilizing the resistance in said conductor, said method comprising:
   measuring the resistance in said conductor;
   comparing the resistance in said conductor with a known resistance utilizing the AC power signal from said conductor; and
   actuating a circuit component to block the AC power signal in said conductor based on said comparison of the resistance in said conductor provided by said comparator with said known resistance.

13. A sensing circuit for blocking AC power in a conductor, utilizing the resistance in said conductor, said sensing circuit comprising:
   an oscillator operable to generate a probe frequency;
   a comparator operable to compare the resistance in a conductor with a known resistance proportional to said probe frequency; and
   an actuator operable to open and close a circuit component based on said comparison of the resistance in said conductor provided by said comparator with said known resistance.

14. The sensing circuit of claim 13, wherein the comparator utilizes a prescribed upper and lower current range, said current range and the probe frequency utilized by said comparator to determine if the current drawn between the first conductor and the second conductor of said drop cable is outside of said current range.

15. The sensing circuit of claim 13, wherein the actuator is driven by said oscillator.

16. A method for blocking AC power in a conductor utilizing the resistance in said conductor, said method comprising:
   generating a probe frequency;
   comparing the resistance in said conductor with a known resistance proportional to said probe frequency; and
   actuating a circuit component based on said comparison of the resistance in said conductor provided by said comparator with said known resistance.

17. A tone sensing circuit, wherein a drop cable is monitored for a generated tone signal, comprising:
   an oscillator, driven by the AC power from said drop cable, operable to generate a tone signal;
   a controller operable to monitor said drop cable for said generated one signal; and
   an actuator operable to open and close a circuit component to block AC power in said drop cable based on whether said controller detects a tone signal.

18. The tone sensing circuit of claim 17, wherein the controller is operable to detect a change in amplitude of said generated tone signal.

19. The tone sensing circuit of claim 17, wherein the actuator is operable to open and close a circuit component to block AC power in said drop cable based on whether said controller detects a change in amplitude of said generated tone signal.

20. A method for detecting a fault condition in a conductor, said method providing a conductor having a first end and a remote end, said method comprising:
   transferring AC power along said conductor from the first end to the remote end;
   locating an oscillator at the remote end of said conductor operable to utilize said AC power for generating a tone signal;
   detecting said generated tone signal; and
   actuating a circuit component to block said AC power in said conductor when said generated tone signal is not detected.

21. A method for selectively blocking AC power from being transferred from a source to a conductor, said method comprising:
   providing AC power from said source to the conductor;
   measuring a parameter indicative of said AC power in said conductor to determine a measured value;
   comparing said parameter indicative of said AC power in said conductor with a predetermined range;
   terminating the transfer of said AC power to said conductor if said measured value is outside of said predetermined range; and
   enabling said AC power to transfer to said conductor if said measured value is within said predetermined range.

* * * * *